May 29, 1951 C. F. CLIFFORD 2,554,523

ESCAPEMENT MECHANISM

Filed Jan. 29, 1948 4 Sheets-Sheet 1

Inventor
Cecil Frank Clifford
By John P. Chandler
his Attorney

May 29, 1951 C. F. CLIFFORD 2,554,523

ESCAPEMENT MECHANISM

Filed Jan. 29, 1948 4 Sheets-Sheet 2

Inventor
Cecil Frank Clifford
By John P. Chandler
his Attorney

Inventor
Cecil Frank Clifford
By John P. Chandler
his Attorney

Inventor
Cecil Frank Clifford
By John P. Chandler
his Attorney

Patented May 29, 1951

2,554,523

UNITED STATES PATENT OFFICE 2,554,523

ESCAPEMENT MECHANISM

Cecil Frank Clifford, Bath, England, assignor to Horstmann Clifford Magnetics Ltd., Bath, England, a limited company of Great Britain Application January 29, 1948, Serial No. 5,142
In Great Britain February 12, 1947

11 Claims. (Cl. 185—46)

This invention relates to magnetic escapement mechanism and is a development of the invention forming the subject of my co-pending application for Patent No. 737,279.

According to the invention of the aforesaid earlier application for patent the magnetic escapement mechanism comprises a magnetic lock between magnetic elements on relatively oscillating and rotating members, one of such elements being in the form of a continuous wavy path adapted to be followed by the other, whereby the speed of oscillation determines the speed of rotation. In all the forms conceived and described in the specification of said earlier invention such continuous path formed an endless track which was followed by the complementary part. The present invention is based upon an appreciation that the wavy track need not form an endless track.

According to the present invention the magnetic escapement mechanism comprises a magnetic lock between magnetic elements on relatively oscillating and rotating members, one member having polar formations and the other member having a complementary wavy magnetic path characterised in that the said wavy path is not an endless track for such polar formations, but is of such length as to embody at least one complete cycle of the wave form for complementary magnetic engagement in succession and continuously by the said polar formations on the said one member.

Figure 1:
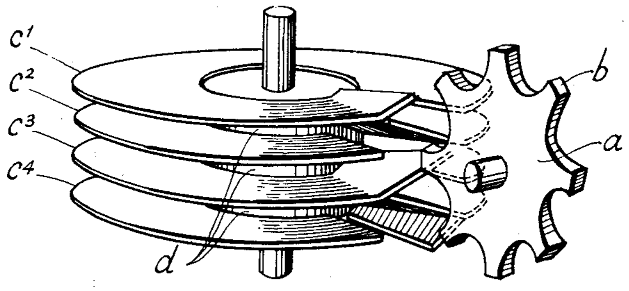
Fig. 1 is a perspective view of one example of escapement mechanism made in accordance with the invention.
Figure 2:
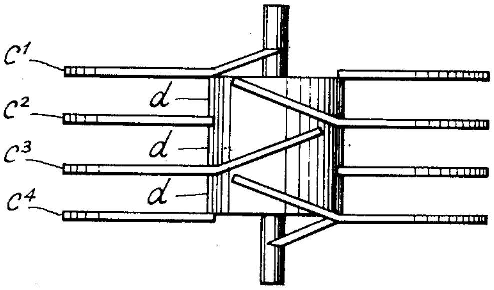
Fig. 2 is a front elevation of part of the mechanism shown in Fig. 1.

In the example shown in Figs. 1 and 2 the escapement comprises a rotary driving member *a* having a plurality of magnetised poles *b* of alternate north and south polarity. Adjacent such driving member is the complementary oscillating member having its axis lying in the plane of rotation of the driving member and formed of an assembly of four discs $c'$, $c^2$, $c^3$ and $c^4$ of magnetically conductive material separated by spacing collars *d* which may be of non-magnetic material, or of magnetic material if of sufficiently smaller diameter. The edge of each disc has a tongue which is bent as shown towards the adjacent disc so that collectively a zig-zag substantially continuous path is formed for presentation to the poles of the magnet wheel.

In operation when the oscillating member is, for example, at one end of its oscillating amplitude, two poles of the magnetic wheel are magnetically locked with the edges of the discs $c'$ and $c^3$. As the oscillating member turns, the zig-zag edge approaches and passes the plane of the magnet wheel and such wheel is allowed to "escape" as the poles follow the edges of the tongues onto the next discs $c^2$ and $c^4$ where they are held whilst the oscillating member completes its amplitude of oscillation. On the return movement, the same cycle is repeated, a new pole of the magnetic wheel coming into operation as one of the first pair leaves. It will be appreciated that the driving wheel gives an impulse to the oscillating member in each direction of its oscillation during escapement as the poles follow each incline of the zig-zag path.

Figure 2A:
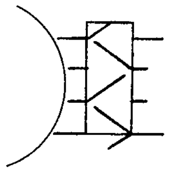
Fig. 2A shows a modification of Fig. 2.

In order to maintain constant energy content of the magnetised air gaps between the polar formations and the complementary wavy magnetic path the edges of the oscillating assembly may be waisted so as to be concentric to the axis of the magnetic driving wheel and thus enable a substantially uniform air gap to be provided for all engaging positions of the poles, as shown diagrammatically in Fig. 2A.

The energy content of the magnetised air gaps aforesaid may be expressed as $$\frac{B^2V}{8\pi}$$

where B is the flux density in the gap or gaps and V is the volume of the gap or gaps (i. e. area times length). For the sake of simplicity the said constant energy content factor is referred to more briefly as constant or uniform magnetic reluctance.

Figure 3:
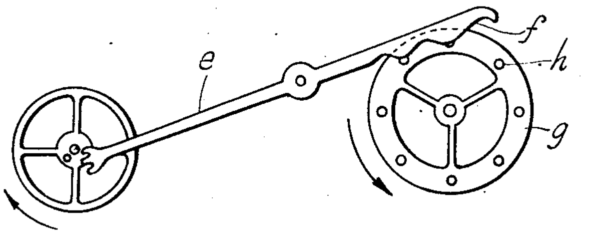
Fig. 3 shows another form of the invention adapted for a lever escapement.

In a modified example of the invention as applied to a lever escapement and as shown in Fig. 3, the lever *e* which is of non-magnetic material, is provided at one end with a short wavy length *f* of magnetic material. The driving wheel *g* of magnetic material has a plurality of stud-like poles *h* of alternate polarity adapted to follow the wave form of the part *f*. Such wave form will obviously require to be shaped of progressively increasing amplitude towards its outer end to compensate for the angularity of movement of the lever and so that two poles may at least for part of the time be simultaneously magnetically locked to the part *f*. The other end of the lever is adapted to be mechanically coupled in normal manner to a balance wheel *e'*.

Figure 4:
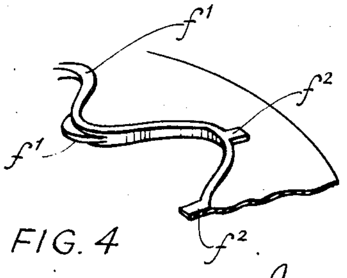
Fig. 4 shows a modification of the construction shown in Fig. 3.

As shown in Fig. 4, the wavy edge of the lever is formed at its apices with thickenings *f'* or extensions $f^2$, which provide a small bias tending to hold the poles *h* at such apices thus providing a resilient magnetic bias tending to hold the lever in its extreme positions and requiring the return movement of the balance wheel to initiate movement of the lever from such positions, and therefore keeping such lever in step with the balance wheel.

Figure 5:
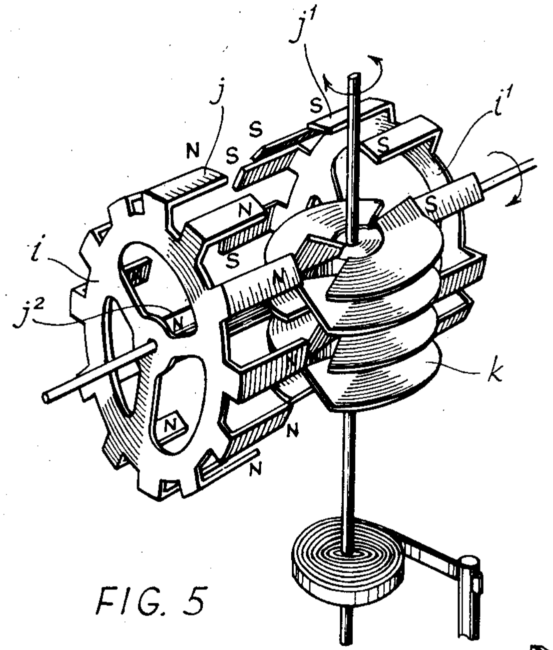
Fig. 5 shows a further alternative construction.

As shown diagrammatically in Fig. 5 two driving members *i* and *i'* are provided which have axially directed magnetic polar extensions *j* and *j'* of polarity as shown. These members form the equivalent of crown wheels and their spindle is a bar magnet $j^2$ and their poles are magnetically locked in succession with a rotatable assembly *k* formed of discs as shown in Figs. 1 and 2.

Compared with the arrangement of Figs. 1 and 2 this construction has the advantage that some of the lateral forces on the parts may be balanced.

Figure 6A:
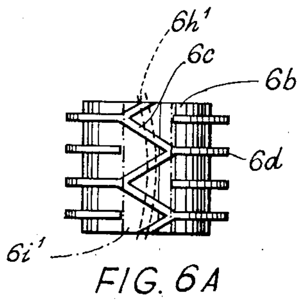
Fig 6A is an enlarged view of the wavy track unit.
Figure 6C:
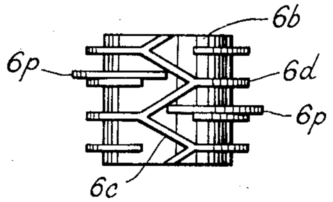
Fig. 6C shows a further modification of the unit shown in Fig. 6A.
Figure 6:
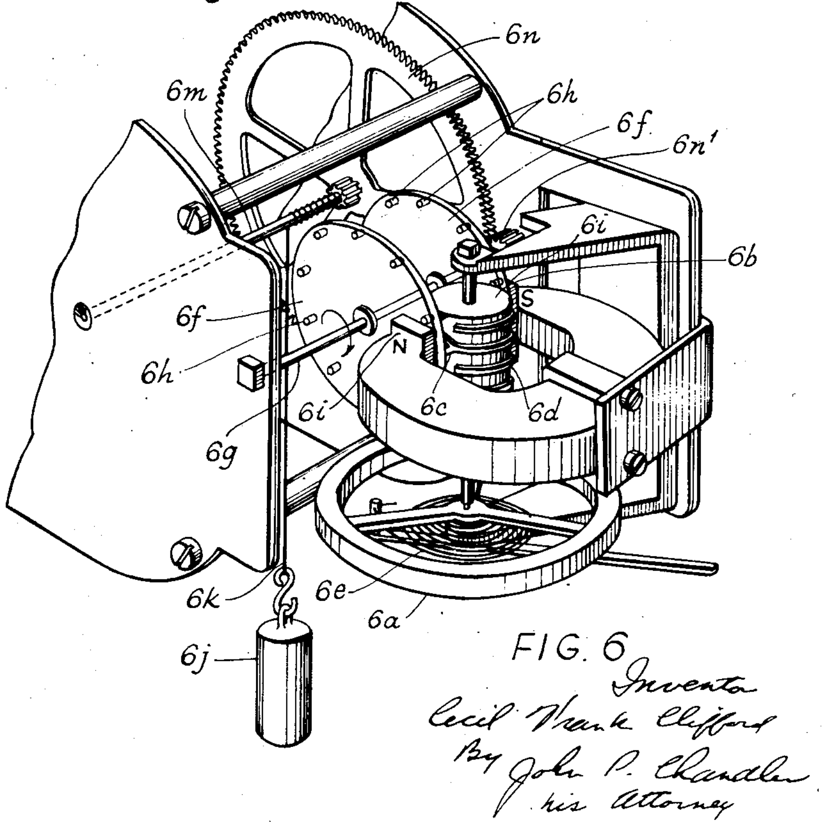
Fig. 6 is a perspective view showing another example of magnetic escapement mechanism made in accordance with the invention.

As shown in Fig. 6 there is provided an oscillatory member comprising a balance wheel 6*a* on the spindle of which is a wavy track unit 6*b* on which is formed, at diametrical positions, a wavy track having crossover zig-zag portions 6*c* and extensions 6*d* of the apices of the wave form similar to that shown in Fig. 2. The balance wheel has a hair spring 6*e*. The rotary member consists of a pair of wheels 6*f* mounted on a spindle 6*g*, each wheel being of transparent plastic material and having a plurality of pins 6*h* in spaced arrangement around its periphery. The wheels are so positioned as to pass close on each side of the wavy track unit and between it and pole shoes 6*i* of a permanent magnet. By using soft iron or Numetal pins for the rotor and soft iron or Mumetal pole shoes for the magnet the hysteresis and eddy current losses may be reduced to a minimum. The path 6*h'* of the pins relative to the wavy unit and the pole shoe area 6*i'* are shown dotted in Fig. 6A. The wheels 6*f* are shown for diagrammatic purposes driven by a small weight 6*j* and cord 6*k* wound on a spindle 6*m* carrying a large gear wheel 6*n* in mesh with a small gear wheel 6*n'* on the spindle 6*g*.

Figures 6B, 7, 7A:
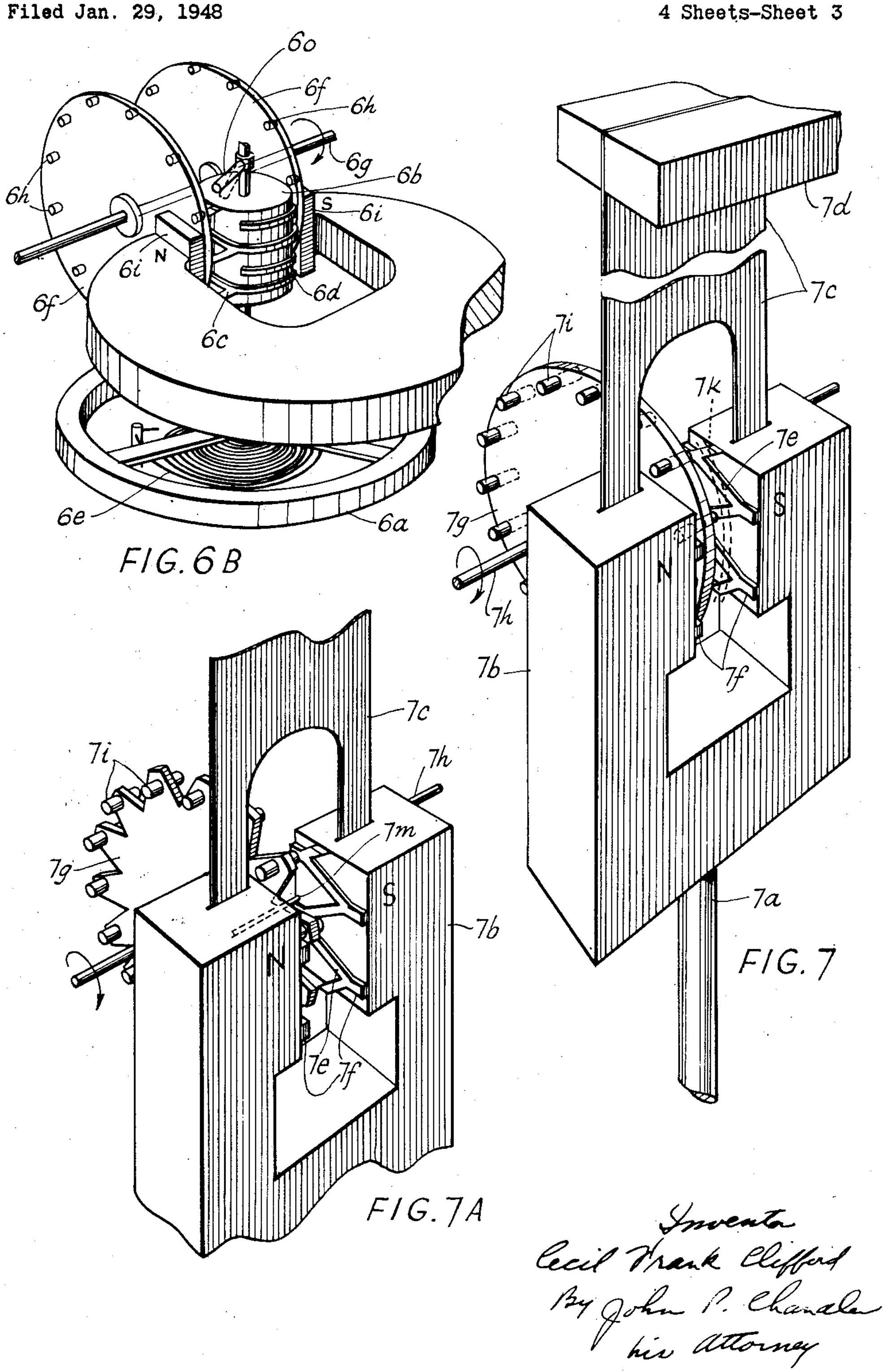
Fig. 6B shows a modification of the mechanism shown in Figs. 6 and 6A.
Fig. 7 shows a further example of the escapement mechanism as applied to a pendulum.
Fig. 7A shows a modification of Fig. 7.

As shown in Fig. 6B there is a small pin 6o of bendable magnetisable material secured to the spindle 6*g* so as to be in the stray magnetic field between the pole shoes of the magnet. By bending the pin 6o downward to the position shown in dotted lines it can be moved more into such stray field and thereby modify the reluctance of the magnetic path as such pin oscillates. By this means it is possible to modify the reluctance so as to control the speed of oscillation at varying amplitudes and thus provide time compensation for such variable.

As shown in Fig. 6C the wavy track unit embodies the same parts as that shown in Fig. 6A and such parts are given the same reference characters. In addition to such parts there are very thin non-magnetic laminations 6*p* which stand "proud of" the magnetic wavy track and act as a mechanical obstruction to the pins 6*h* in the complementary wheels 6*f* which pins are also of such length as to stand "proud of" the wheels. If the magnetic lock between the pins and the track is momentarily broken the rotary member cannot "run away" because of the temporary mechanical lock which will allow relative oscillatory movement but not rotary movement until the magnetic lock is re-established.

As shown in Fig. 7, at the upper end of a pendulum rod 7*a* there is a permanent magnet 7*b* suspended by a ribbon 7*c* of non-magnetic material, the upper end of which is secured in a bracket 7*d*. The lower end of the ribbon 7*c* is notched to bridge the poles of the magnet and allow the passage of the edge of the rotary member described later. On each of the pole faces of the magnet there is secured a wavy track element of soft iron having crossover zig-zag portion 7*e* and extensions 7*f* of the apices of the wave form. The rotary member consists of a wheel 7*g* of non-magnetic material mounted on a spindle 7*h* and adapted to be driven by any suitable means not shown such as clockwork or weight and gearing. In the wheel 7*g* are a plurality of pins 7*i* of magnetisable material such as soft iron of low reluctance, so arranged relative to the magnet poles that if the wheel were turned while the magnet is stationary the ends of the pins would trace a path substantially as shown by the dotted lines 7*k* on the one pole face.

The action of the escapement mechanism is obvious in that, as the magnet 7*b* oscillates with the pendulum, the wheel 7*g* turns so that the pins 7*i* follow the crossover zig-zag parts 7*e* of the wavy track or are magnetically locked to the extensions 7*f* of the apices if the amplitude of the pendulum oscillation is sufficient to bring these extensions opposite the pins.

As shown in Fig. 7A, the edge of the wheel 7*g* is notched and a pin 7*m* of non-magnetic material is fixed between the poles of the magnet so that it will move in and out of the said notches with oscillation of the pendulum without actually contacting the wheel unless the magnetic lock is momentarily broken, when it will check the wheel 7*g* from running free and will restore the magnetic lock.

Figures 8, 9, 10:
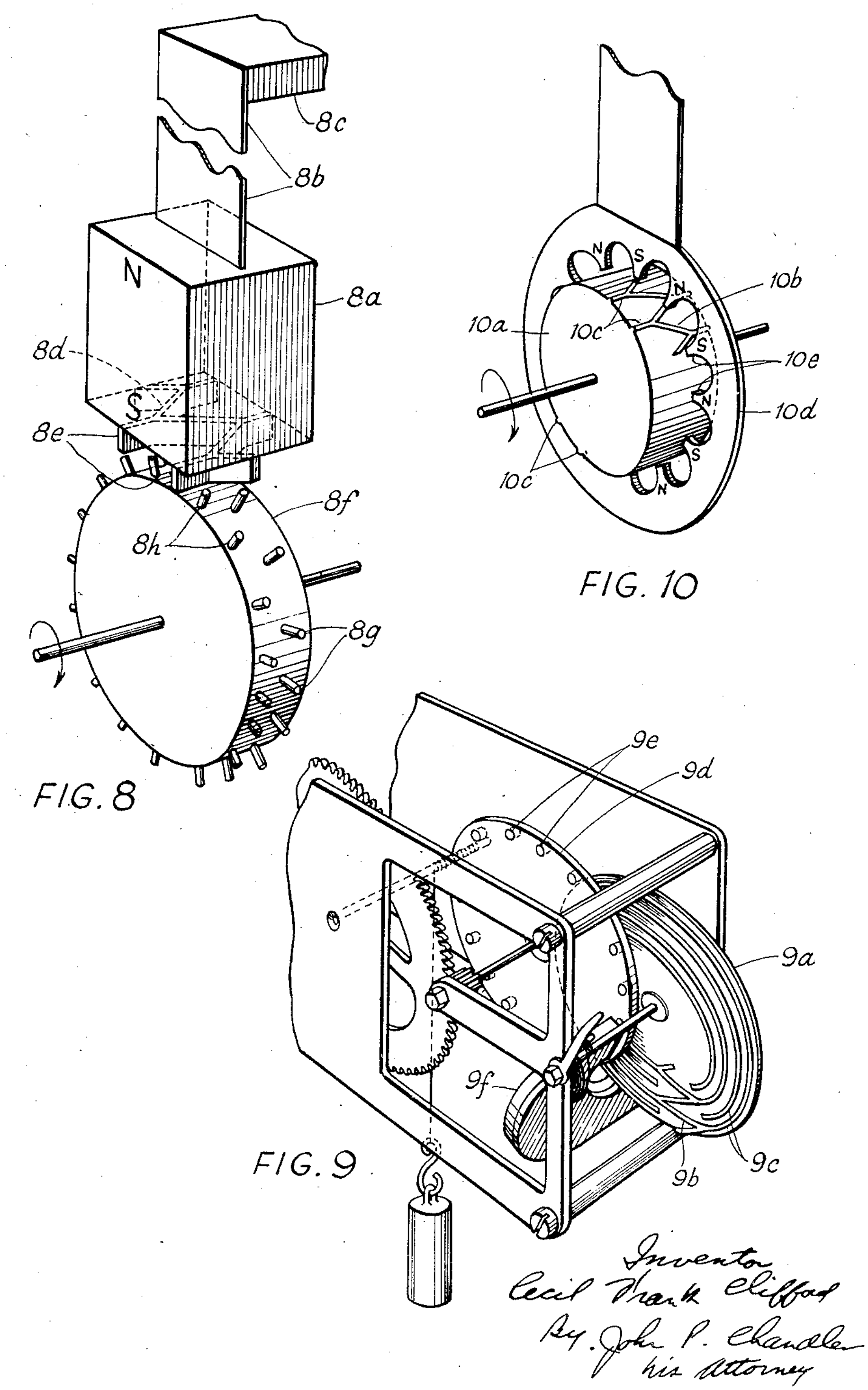
Figs. 8, 9 and 10 show further constructional forms of the invention.

The construction shown in Fig. 8 is a type of reed, the inertia weight of which is in the form of a permanent magnet 8*a* suspended by a flexible strip 8*b* from a bracket 8*c*. One pole face of the magnet has attached to it a wavy path of soft iron with crossover zig-zag portions 8*d* and extension 8*e* of the apices of the wave form. Below the magnet is mounted the rotary member in the form of a wheel 8*f* of non-magnetic material having magnetisable studs 8*g*. Further studs 8*h* of non-magnetic material located on one edge of the wheel and spaced intermediate of the studs 8*g* provide mechanical safety lock which by engaging the raised wavy path will operate to check the rotor and reinstate the magnetic lock between the studs 8g and the wavy path if this magnetic lock is accidentally broken. It will be noted that the pull of the magnet will help to take the rotor weight off the bearings.

The construction shown in Fig. 9 embodies a balance wheel 9a formed on one of its faces with a raised wavy magnetisable path having crossover portions 9b and annular extensions 9c of the apices of the zig-zag wave form. Adjacent such face of the balance wheel is a rotary member in the form of a disc 9d of non-magnetic material having magnetisable studs 9e at spaced intervals around its periphery to co-operate with the wavy path. The balance wheel and disc are embraced by the poles of a magnet 9f while the disc is adapted to be rotated through any suitable gearing by clockwork or weight.

The diagrammatic construction of Fig. 10 illustrates an arrangement in which the length of wavy track may be formed on the rotary member instead of on the oscillator as in all the preceding examples. As can be seen, the rotary member 10a has two diametrically opposed lengths of wavy track of magnetisable material comprising crossover portions 10b and extensions 10c of the apices of the zig-zag wave form. The oscillator is of pendulum form and consists of a weight 10d of permanent magnet material shaped and magnetised to form a ring magnet with internal north and south poles 10e complementary to the lengths of wavy track. Two lengths of wavy track are provided for balance though one length could be sufficient for operation of the escapement.

It has been found that the highest efficiencies are associated with wavy tracks whose average angle of inclination is approximately 45°.

What I claim is:

1. A magnetic escapement comprising, a rotating member which includes a non-magnetic disc provided with discrete magnetic lugs adjacent to the periphery thereof, an oscillating member which includes a non-magnetic rotatable cylinder provided with discontinuous magnetic strips on the surface thereof, and a source of magnetic flux having pole pieces disposed adjacent to the lugs on the rotating member and the strips on the oscillating member.

2. A magnetic escapement comprising, a rotating member which includes a non-magnetic disc provided with discrete magnetic lugs mounted in the disc adjacent to the periphery thereof and extending through the disc body, an oscillating member which includes a non-magnetic rotatable cylinder provided with discontinuous magnetic strips on the surface thereof, and a source of magnetic flux having pole pieces disposed adjacent to the lugs on the rotating member and the strips on the oscillating member.

3. A magnetic escapement comprising a power driven rotating member which includes a non-magnetic disc provided with discrete magnetic lugs mountd in the disc adjacent to the periphery thereof and extending through the disc body, an oscillating member for controlling the speed of rotation of the power driven member, said oscillating member comprising a non-magnetic rotatable cylinder provided with discontinuous magnetic strips on the surface thereof, and a source of magnetic flux having pole pieces disposed adjacent to the lugs on the rotating member and the strips on the oscillating member.

4. A magnetic escapement comprising a power driven rotating member which includes a non-magnetic disc provided with discrete magnetic lugs mounted in the disc adjacent to the periphery thereof and extending through the disc body, an oscillating member for controlling the speed of rotation of the power driven member, said oscillating member comprising a non-magnetic rotatable cylinder provided with discontinuous magnetic strips on the surface thereof, and a permanent magnet having stationary pole pieces disposed adjacent to the lugs on the rotating member and the strips on the oscillating member.

5. A magnetic escapement comprising a power driven rotating member which includes a non-magnetic disc provided with discrete magnetic lugs mounted in the disc adjacent to the periphery thereof and extending through the disc body, an oscillating member for controlling the speed of rotation of the power driven member, said oscillating member comprising a non-magnetic rotatable cylinder provided with discontinuous magnetic strips on the surface thereof, a permanent magnet having stationary pole pieces disposed adjacent to the lugs on the rotating member and the strips on the oscillating member, and mounting means for restraining the rotating member and the oscillating member in relative positions whereby the effective air gap in the magnetic path between the pole pieces is constant.

6. A magnetic escapement comprising a power driven rotating member which includes a non-magnetic disc provided with a plurality of equally spaced discrete magnetic lugs mounted in the disc adjacent to the periphery thereof and extending through the disc body, an oscillatory member for controlling the speed of rotation of the power driven member, said oscillating member comprising a non-magnetic rotatable cylinder provided with strips of magnetic material arranged in a wavy pattern on the surface of the cylinder, a permanent magnet having fixed pole pieces adjacent to the lugs on the rotating member and the wavy strips on the oscillating member, and mounting means for restraining the rotary member and the oscillating member in relative positions whereby the effective air gap in the magnetic path between the pole pieces is constant.

7. A magnetic escapement comprising a power driven rotating member which includes a non-magnetic disc provided with a plurality of equally spaced discrete magnetic lugs mounted in the disc adjacent the periphery thereof, an oscillating member for controlling the speed of rotation of the power driven member, said oscillating member comprising a non-magnetic rotatable cylinder provided with strips of magnetic material arranged in a wavy pattern on the surface of the cylinder substantially in accordance with the locus of the geometric projection of the lugs upon the cylinder during relative rotary and oscillatory motion of the members, a permanent magnet having fixed pole pieces disposed adjacent to the lugs on the rotating member and the wavy strips on the oscillating member, and mounting means for restraining the rotary member and the oscillating member in relative positions whereby the effective air gap in the magnetic path between the pole pieces is constant.

8. A magnetic escapement comprising a power driven rotating member which includes a non-magnetic disc provided with a plurality of equally spaced discrete magnetic lugs mounted in the disc adjacent the periphery thereof, an oscillating member for controlling the speed of rotation of the power driven member, said oscillating member comprising a non-magnetic rotatable cylinder provided with strips of magnetic material arranged in a wavy pattern on the surface of the cylinder substantially in accordance with the locus of the geometric projection of the lugs upon the cylinder during relative rotary and oscillatory motion of the members, a permanent magnet having fixed pole pieces disposed adjacent to the lugs on the rotary member and the wavy strips on the oscillating member, and mounting means for restraining the rotary member and the oscillating member in relative positions whereby the magnetic reluctance between pole pieces is constant.

9. A magnetic escapement mechanism according to claim 8, further characterized in that the wavy magnetic path is provided with extensions at the apices permitting the oscillating member to have a movement of greater amplitude than the normal wave while maintaining constant reluctance between the pole pieces.

10. A magnetic escapement mechanism according to claim 8, further characterized by an additional magnetisable element adjustably carried by the oscillating member and positioned in the stray field of the permanent magnet whereby adjustment may be made to obtain a desired value of reluctance to control the speed of oscillation at varying amplitudes.

11. A magnetic escapement mechanism according to claim 8, further characterized in that the rotary member is provided with one or more mechanical non-magnetic obstruction elements so positioned as to permit the magnetic lugs to follow the magnetic strips while physically preventing them from moving into a position where the magnetic reluctance increases to value greatly in excess of the constant value.

CECIL FRANK CLIFFORD.

REFERENCES CITED

The following references are of record in the file of this patent:

UNITED STATES PATENTS

| Number | Name | Date |
| --- | --- | --- |
| 1,277,371 | Boyle et al. | Sept. 3, 1918 |
| 1,517,008 | Jones | Nov. 25, 1924 |
| 1,825,382 | Baker | Sept. 29, 1932 |
| 2,061,047 | Schweitzer | Nov. 17, 1936 |
| 2,373,429 | Straumann | Apr. 10, 1945 |